Jan. 18, 1955     C. E. HUSTON     2,699,877
VEGETABLE HARVESTER Filed Nov. 17, 1950     8 Sheets-Sheet 1

CHARLES E. HUSTON,
INVENTOR.

HUEBNER, BEEHLER,
BY WORREL & HERZIG,

ATTORNEYS.

Jan. 18, 1955 C. E. HUSTON 2,699,877
VEGETABLE HARVESTER
Filed Nov. 17, 1950 8 Sheets-Sheet 4

Fig. 4.

CHARLES E. HUSTON,
INVENTOR.
HUEBNER, BEEHLER, WORREL & HERZIG,
BY
ATTORNEYS.

Jan. 18, 1955

C. E. HUSTON 2,699,877

VEGETABLE HARVESTER

Filed Nov. 17, 1950

Charles E. Huston,
INVENTOR.

Huebner, Beehler, Worrel & Herzig,
BY
Attorneys.

Jan. 18, 1955  C. E. HUSTON  2,699,877
VEGETABLE HARVESTER
Filed Nov. 17, 1950  8 Sheets-Sheet 6

CHARLES E. HUSTON,
INVENTOR.

HUEBNER, BEEHLER, WORREL & HERZIG,
BY

ATTORNEYS.

Jan. 18, 1955

C. E. HUSTON 2,699,877

VEGETABLE HARVESTER

Filed Nov. 17, 1950

CHARLES E. HUSTON,
INVENTOR.

HUEBNER, BEEHLER, WORREL & HERZIG,
BY

Vernon D. Beehler

ATTORNEYS.

United States Patent Office 2,699,877
Patented Jan. 18, 1955

2,699,877
VEGETABLE HARVESTER

Charles E. Huston, El Centro, Calif.

Application November 17, 1950, Serial No. 196,262

11 Claims. (Cl. 214—83.26)

The invention relates to agricultural machinery and has particular reference to harvesting machinery especially adapted to the harvesting and packing of low-growing vegetables so that a great number of rows of vegetables can be harvested, packed and delivered to vehicles for transportation elsewhere as the harvester continues in operation over the field.

Certain kinds of low-growing crops of which lettuce is an example are grown in warmer regions in great quantities for shipment to colder regions at a time of the year when that particular crop cannot be grown in the colder region. One of the most essential factors in the successful growing, shipping and marketing of the crop is to be able to harvest the crop when mature with extreme rapidity so that it can be taken from the field packed in suitable shipping containers loaded on freight cars and transported over great distances and under adverse climatic conditions sufficiently rapidly so that it can be placed on the market for retail consumption while still fresh and crisp and without at the same time requiring excessive and costly refrigeration methods to maintain the freshness.

In the regions where the crops are grown temperature changes materially influence the condition of the crop after it is packed. Experience has taught that the condition is best maintained when the crop is picked early in the morning or at night after the crop has cooled naturally from the heat of the day which circumstance makes it highly advantageous to complete the packing and local shipping of the crop as well as the picking before the day's temperature rises to an appreciable degree.

Also in the regions where the crops are grown, crops of the same character such as lettuce are planted extensively over a rather large section of the state but in fields of sufficient size and of such level character that harvesting by means of machinery can be practiced advantageously. It must, however, be possible to readily transport the machinery from one locale to another. As an aid to harvesting by machinery the rows are planted in uniform widths to accommodate the usual span of wheels on commercial vehicles so that the vehicles can run along the rows from one end to the other without damaging the crops.

Although various machines have heretofore been developed for different sorts of agricultural crops, for the most part those machines have been adapted to crops, of which pineapples may be cited as an example, where the need for haste in harvesting is not critical. Other machines have also been devised more adaptable to areas of such size that the machines can be used continuously without the necessity of quickly transporting them from one field to another or from one region to another. Where other conditions exist as where the fields may be small or separated one from another or where after a crop has matured and has been harvested there may be need for suddenly shifting operations to another sector where it is advantageous or even necessary to immediately begin harvesting in the other sector, the old machines have little practical utility.

It is therefore among the objects of the invention to provide a new and improved harvesting machine for low-growing crops which is particularly versatile in that wings of appreciable length adapted to be spread out to accommodate many rows at a time can be quickly and efficiently hauled into an inoperative position upon a vehicle, which vehicle can then be driven from one field or sector to another either near or remote and can then be very quickly set up for operation at the new locality.

Another object of the invention is to provide in a mobile harvesting machine an arrangement for lifting and folding wings of such character that wings of especially great length can be employed without the necessity of increasing the size of the vehicle to which they are attached.

Still another object of the invention is to provide on a vehicle of more or less standard construction and capacity a harvester structure which will be substantially complete in that it is provided with loading platforms, packing stances, conveyors for both full and empty crates, a lidding operation for crates from all portions of the conveyor system, and a special loading conveyor so that the lidded crates may flow from the operation without interfering with the packing operation, all portions of the operation being transportable by the truck or vehicle which is additionally equipped with a separate power plant so that an abundance of power is available for all of the mechanical phases of the operation.

A still further object of the invention is to provide a vehicle upon which collapsible conveyor wings of especially great length are mounted and wherein the lifting arrangement for the wings is so devised that the entire span of the wings may be lifted a slight amount at the ends of the rows to facilitate turning the harvester around in order to pass along an adjacent set of rows in a reverse direction and which further is so constructed that when the entire harvester is to be transported to another location, the wings may be more compactly folded and anchored in place within the ordinary span of the vehicle so that the harvester may be driven down the highway without interrupting the regular travel of other vehicles thereon.

It is also among the objects of the invention to provide in a harvester of the type described elements such as adjustable packer stations, an intermediate transverse conveyor, locking devices and sundry improvements which may be operable either hydraulically or electrically from an independent source of power on the vehicle to the end that there may be provided an efficient complete harvester unit capable of rapid harvesting operations under many and varied conditions.

With these and other objects in view, the invention consists in the construction, arrangement and combination of the various parts of the device whereby the objects contemplated are attained, as hereinafter set forth, pointed out in the appended claims and illustrated in the accompanying drawings.

Figure 1:
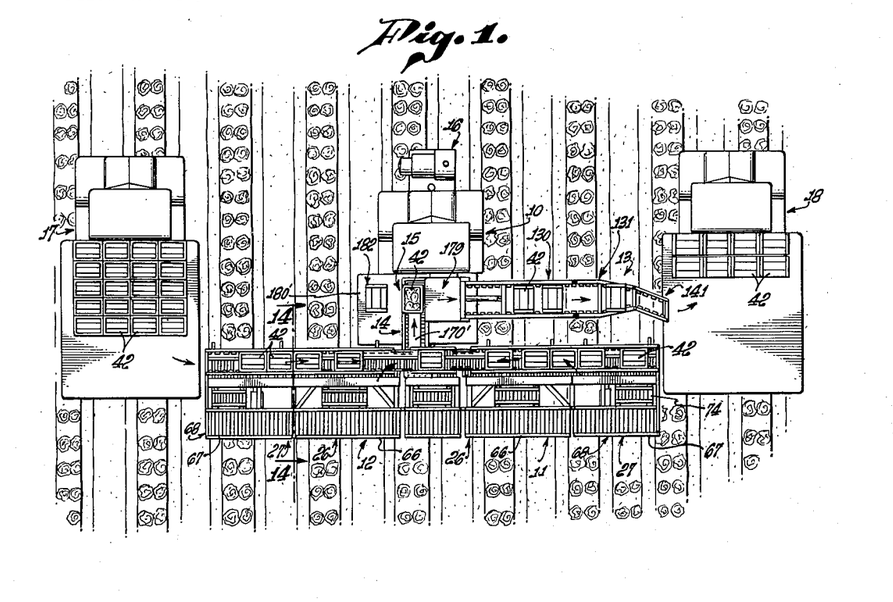
Figure 1 is a plan view showing the harvester with wings and conveyors spread in operative position in a field of low-growing crops with attendant vehicles for the delivery of crates thereto and therefrom.
Figure 2:
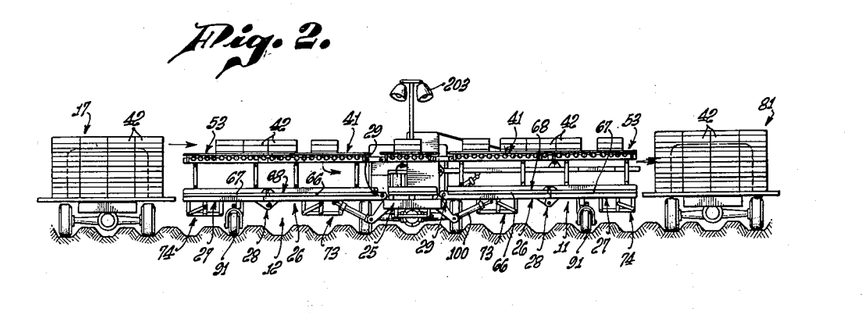
Figure 2 is a rear elevational view of the harvester as depicted in Figure 1.
Figures 4, 23:
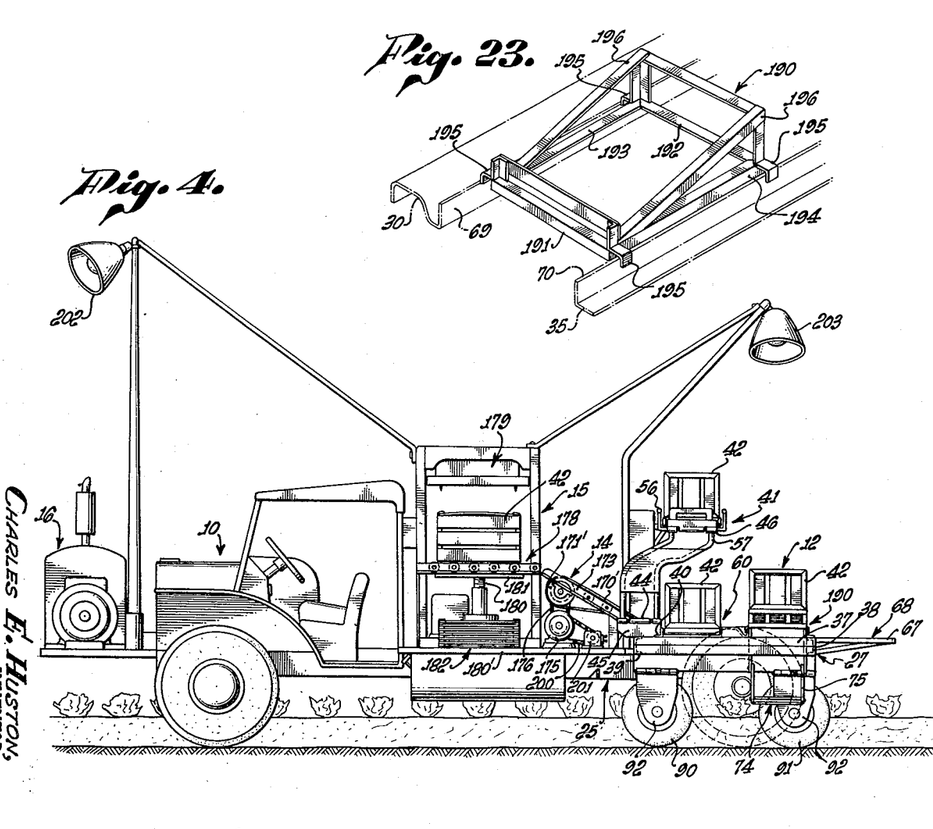
Figure 4 is a side elevational view of the device of Figure 1 drawn to a larger scale.
Figure 23 is a perspective view of one of the packing racks showing its location on a packing track.

The harvester herein described is one adapted to be mounted upon and carried by a commercial auto truck indicated generally by the reference character 10 in Figures 1 and 4 wherein the body of the truck at the rear portion has been modified to some extent for adaptation to the parts of the harvester. Essentially the harvesting machine or harvesting plant comprises in addition to the auto truck main wings 11 and 12 on the right and left, respectively, of the auto truck, a full crate conveyor 13, a transverse conveyor 14 between the wings and the full crate conveyor, a lidding station 15 and a power plant 16 auxiliary to the power plant of the auto truck and carried at the forward end. A service truck 17 is shown in a position for unloading empty crates at the end of the wing 12 and another service truck 18 is shown in a position for loading full crates from the harvester adjacent the end of the full crate conveyor 13.

The rear of the auto truck 10 for accommodation of the harvester is cleared to form a platform 25 of sufficient length to accommodate the wings at the rear portion of the platform and the lidding station at the forward portion of the platform with the conveyor 14 extending therebetween. Wings 11 and 12 are identical in all material respects except that one on one side of the machine is the reverse of the other. Therefore, a description of one of the wings will suffice for both.

As clearly seen in Figures 1, 2, 3, 5 and 7 the wing 11 on the right-hand side of the truck comprises an inner section 26 and an outer section 27 attached together at their adjacent ends by means of a hinged joint 28. At its inner end the inner section 26 is joined to the platform 25 by a hinged joint 29, this joint having its axis slightly above and along the side edge of the platform in a horizontal plane.

Conveyors on the wings

Figure 12:
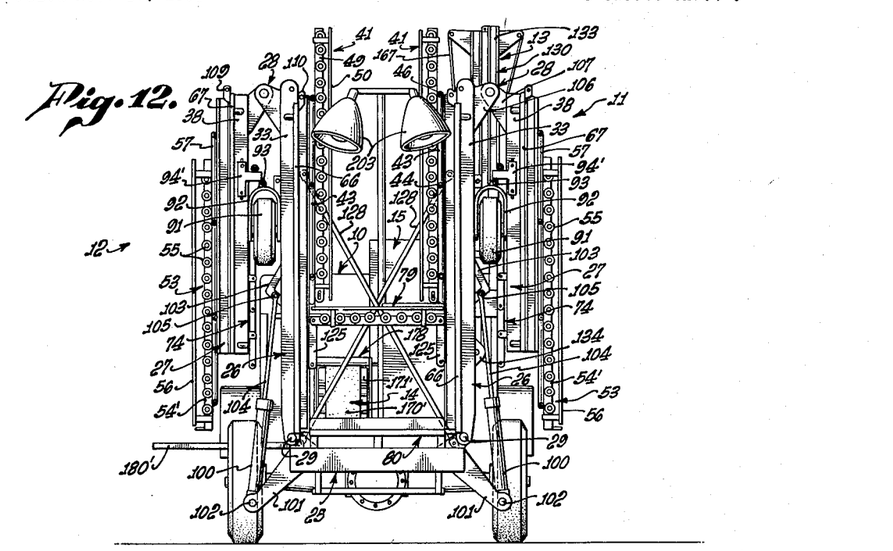
Figure 12 is a rear elevational view of the harvester showing the wings and full crate conveyor in collapsed position for transport down the highway.

The inner section 26 includes a frame formed partly of a frame member 30, the frame comprising end elements 31, diagonal braces 32, a longitudinal frame element 33 at the rear, a longitudinal frame element 34 at the forward side and an intermediate frame element 35 parallel thereto. The outer wing section 27 is built in a somewhat similar fashion having a frame member 36 located endwise with respect to the frame member 30, an outer end element 37 transverse thereto and a longitudinally disposed frame element 38 at the rear and corresponding longitudinal frame elements 39 and 40 at the front. As previously indicated the outer wing section and the inner wing section are pivoted together so as to form what might be termed a jackknife joint when the wing is collapsed to the end that the inner wing section moves up and the outer wing section moves down to fold against the inner wing section as indicated in Figure 12.

Figures 5, 22:
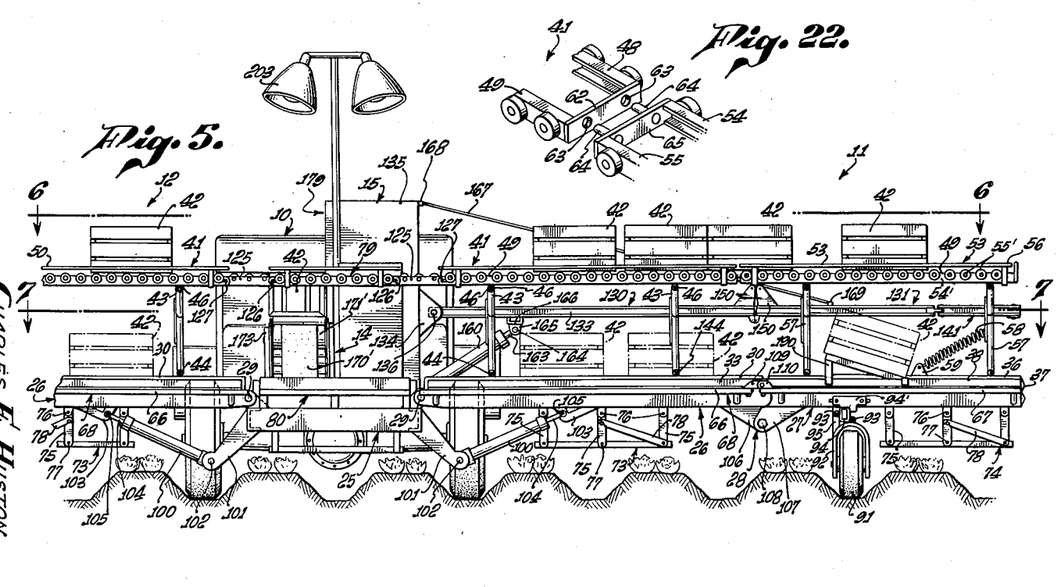
Figure 5 is a partial rear elevational view of the device of Figure 1 showing one of the extended wings in full.
Figure 22 is a fragmentary prospective view showing the joint between sections of the wing.
Figures 14, 15:
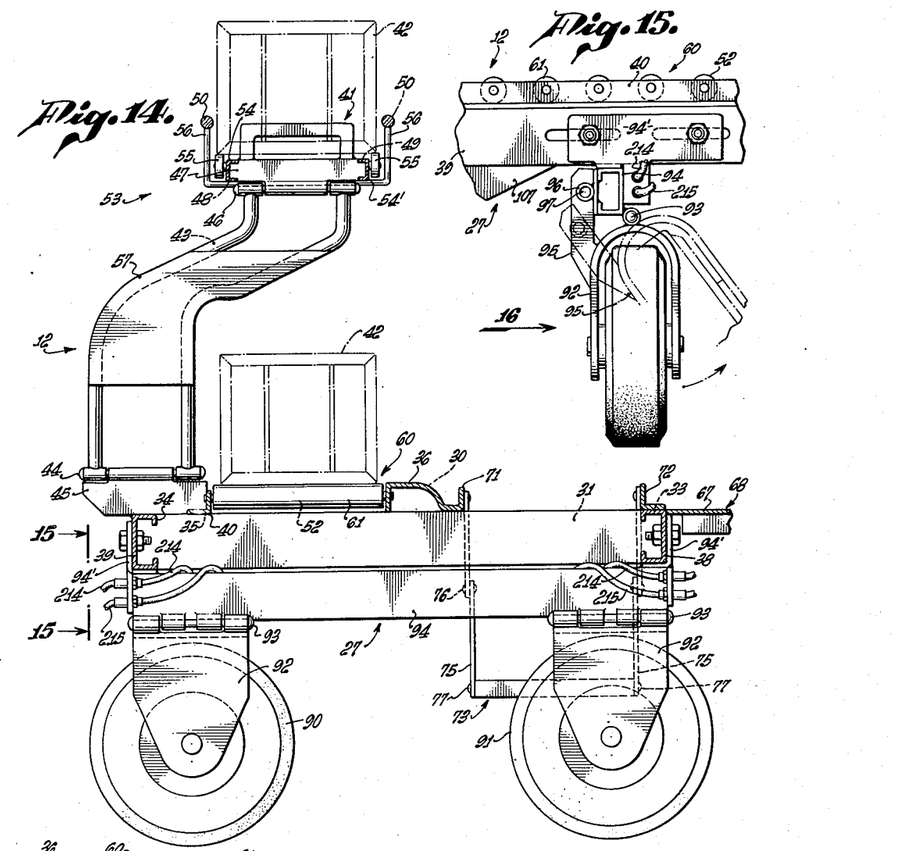
Figure 14 is a cross-sectional view taken on the line 14—14 of Figure 1.
Figure 15 is a fragmentary front elevational view of a supporting wheel for one of the wings taken on the line 15—15 of Figure 14.

On the inner wing section is an empty crate conveyor element 41 occupling an upper position as clearly illustrated in Figure 5 and also Figure 14. The conveyor element has the customary rollers along which empty crates 42 may roll. The empty crate conveyor element is supported by means of bent columns 43, the bottoms of which are attached by means of a hinged joint 44 to a plate 45 on the main portion of the wings. At the upper ends the columns are joined by a hinged joint 46 to a plate 47 which in turn mounts channels 48 and 49 at the forward and rear sides of the empty crate conveyor as seen to good advantage both in Figures 6 and 14. Guards 50 assist in holding the crates 42 in position on the conveyor.

Figure 7:
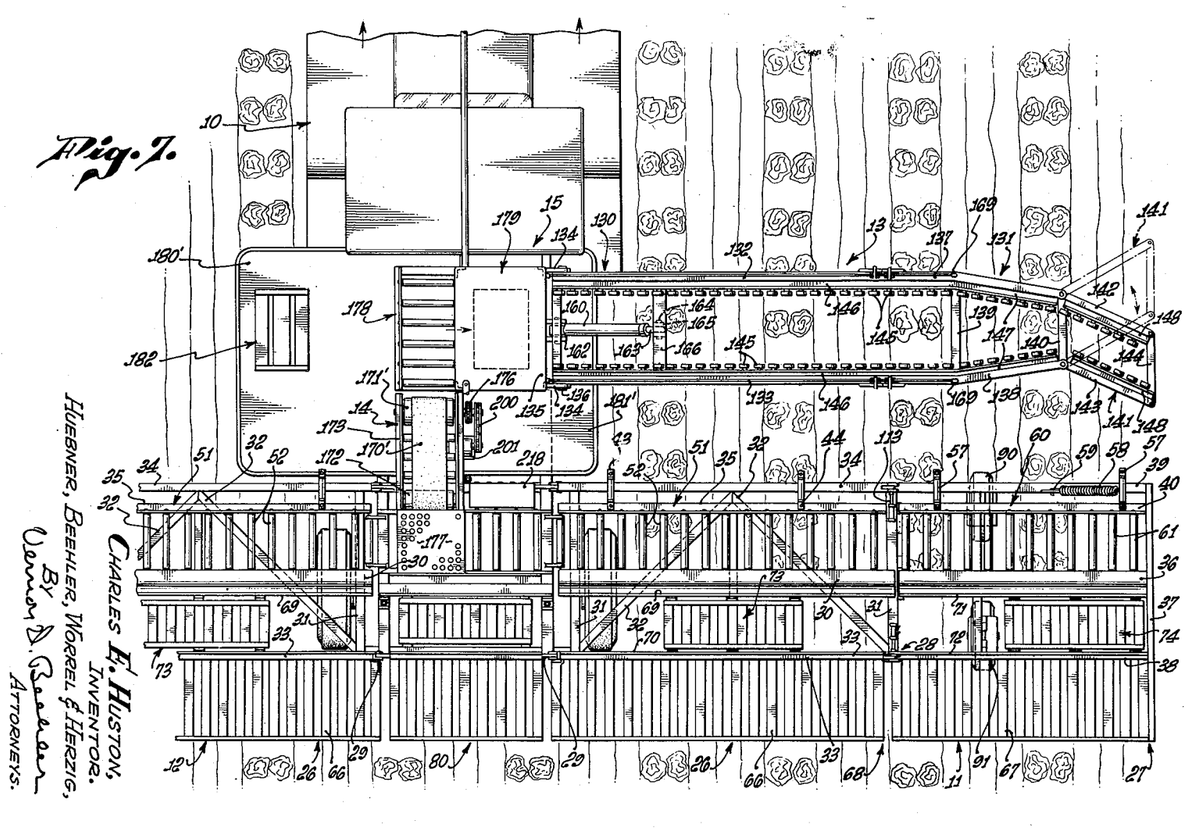
Figure 7 is a partial plan view, taken on the line 7—7 of Figure 5, showing the wings extended and the full crate conveyor extended with the empty crate conveyor elements removed for clarity in illustrating the wing structure.
Figure 8:
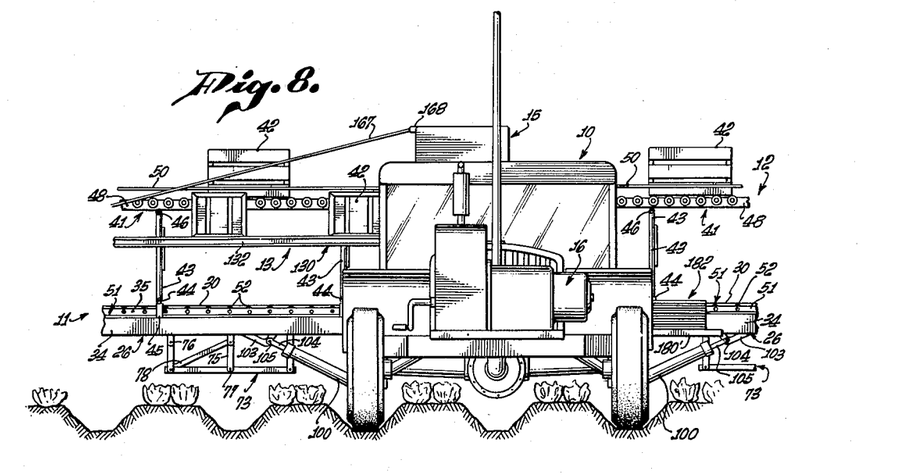
Figure 8 is a partial front elevational view of the vehicle showing ends of the wings adjacent the vehicle and the end of the full crate conveyor in extended or operative position.
Figures 17, 19:
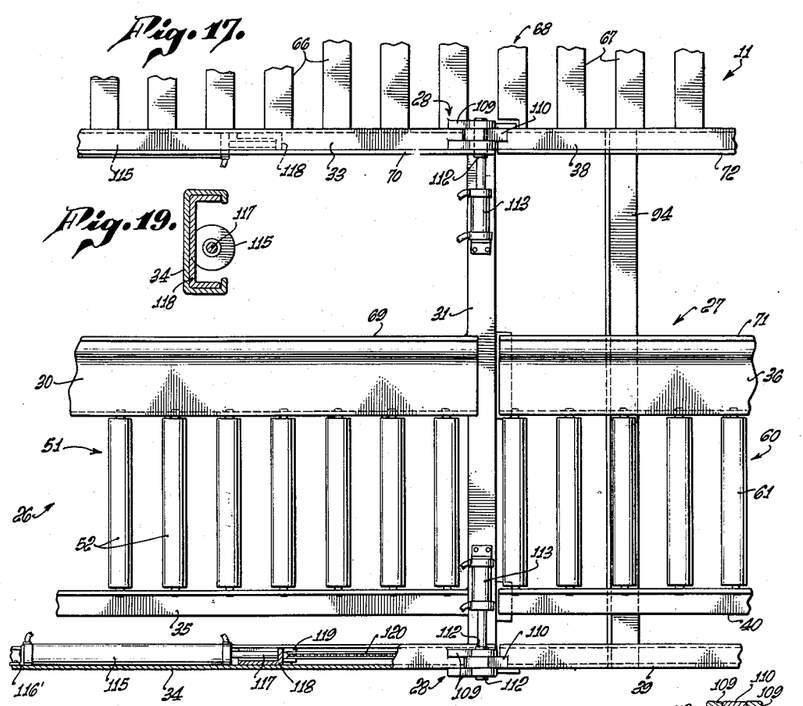
Figure 17 is a fragmentary plan view of a portion of one of the wings at the joint thereof intermediate the ends showing the lower conveyor on one side and a portion of the packing track adjacent thereto.
Figure 19 is a cross-sectional view taken on the line 19—19 of Figure 18.
Figures 18, 20, 21:
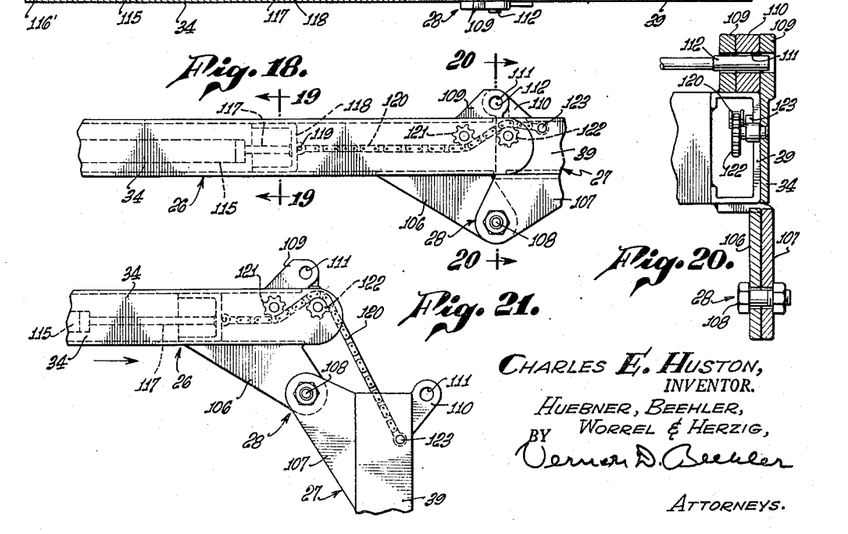
Figure 18 is a front elevational view of a portion of the wing structure adjacent the joint intermediate the ends thereof.
Figure 20 is a fragmentary cross-sectional view taken on the line 20—20 of Figure 18.
Figure 21 is a fragmentary elevational view comparable to the view of Figure 18 but with parts of the wing partially collapsed.

Below the empty crate conveyor element is a full crate conveyor element indicated generally by the reference character 51, the extent and location of which can best be viewed in Figure 7. The full crate conveyor element comprises long rollers 52 located between the longitudinal frame elements 30 and 35. The arrangement of this structure is best seen in Figures 14 and 17.

Figure 6:
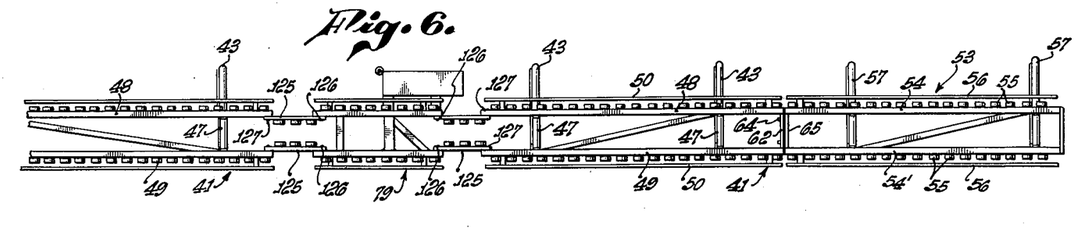
Figure 6 is a partial plan view, taken on the line 6—6 of Figure 5, of the empty crate conveyor elements.

The outer wing section 27 in each case as shown in Figures 5 and 6 is similarly equipped with an upper conveyor element indicated generally by the reference character 53 comprising channels 54 and 54' for the mounting of rollers 55 at the sides of which are positioned guards 56. Bent columns 57 support the upper conveyor element in the same fashion as the corresponding element is supported on the inner wing section. A tension spring 58 is mounted diagonally between a bracket 59 at the lower portion of the wing and the outermost pair of bent columns 57 to assist in collapsing the upper conveyor element when desired. The outer wing section also includes a lower full crate conveyor element 60 made up of rolls 61 and disposed endwise with respect to the corresponding conveyor element 51 of the inner wing section.

The upper empty crate conveyor elements 41 and 53 are provided with a joint therebetween shown in detail in Figure 22 comprising a transverse bar 62 having holes 63 therein adapted to accommodate pins 64 on a transverse bar 65 of the conveyor element on the outer wing section.

Also on the inner and outer wing sections respectively are segments 66 and 67 of a loading platform and indicated generally by the reference character 68 in Figure 4. The loading platform extends rearwardly of the platform and is composed of slats adapted to receive the cut heads of lettuce or other crops as they are picked from the ground and placed upon the harvester.

Between the loading platform and the full crate conveyor elements on the wings is what may be termed a packer station. For convenience the inner wing section is provided with a pair of spaced packing tracks 69 and 70, the general form of which can best be seen in Figure 23. These packing tracks extend lengthwise of the section. Similar tracks 71 and 72 are located on the outer wing section in each case. Beneath the packing tracks are platforms 73 on the inner wing section and 74 on the outer wing section. The inner platform, for example, is suspended by strips 75 having hinged joints 76 at the top to the wing section and 77 at the bottom to the platform so that the platform may be collapsed. A removable brace 78 is adapted to lock the platform in operative position when the machine is in operation.

Above the platform 25 there is mounted an intermediate empty orate conveyor element 79 in alignment with the empty crate conveyor element 41 on the inner wing section so that the empty crate conveyor as a whole is continuous from one side of the machine to the other. Also on the platform are full crate conveyor elements 80 in alignment with the full crate conveyor elements 51 of the wing sections so that the full crate conveyor is continuous also from side to side of the machine.

Collapsible support and structure of wings

Figure 16:
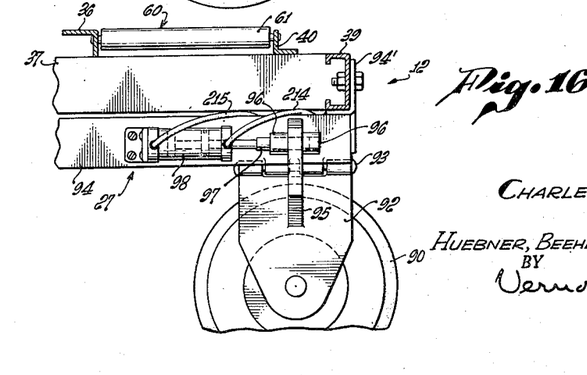
Figure 16 is a fragmentary side elevational view of one of the wheels and the mounting therefor taken at the location of the arrow 16 in Figure 15.

The wing in each case is supported by means of wheels 90 and 91, the wheels being attached to the outer wing sections 27 in each case. Details of the manner of attaching the wheels are illustrated in Figures 14, 15 and 16. As there shown forked supports 92 provide a mounting for the wheel in each case. The forked support has a hinged joint 93 at the top by means of which the forked support is attached to a cross channel 94 secured to plates 94' which are adjustably attached to the frame elements 38 and 39. The wheels can thus be adjusted to the rows.

For locking the forked member in the operative position shown in Figures 14, 15 and 16 there is provided a bracket 95 on the inside of the forked member which extends outwardly to a position adjacent bushings 96 on the cross channel. Aligned apertures in the bracket and bushings accommodate a pin 97 actuated by a small hydraulic ram 98 which is adapted to insert the pin for locking the forked member in position and for removing it therefrom when the forked member is to be folded as it moves in the direction of the arrow of Figure 15 as the wing to which it is attached is collapsed.

The wings are elevated from operative to inoperative position by hydraulic cylinders or rams 100. The rams are of sufficient capacity so that one ram on each side is capable of raising the entire wing on that side. To obtain a thrust by the ram in the proper direction for raising the entire wing to the position shown in Figure 3 or for lifting the wing completely to a collapsed position such as that illustrated in Figure 12, a heavy depending bracket 101 extends obliquely downwardly and outwardly from the platform 25. This structure is readily visible in Figures 2, 3, 5 and 12. The hydraulic cylinder is pivotally secured to the bracket 101 at a joint 102.

At the lower side of the inner wing section 26 is a bracket 103 and a piston rod 104 extending outwardly from the cylinder 101 is pivotally attached to the bracket 103 at a joint 105. The angular disposition of the cylinder and piston rod 104 makes possible the application of power in a direction such that lift on the wing is greatly facilitated.

To maintain proper control over the collapsing and extension of the wing sections a second hydraulic ram or pair of rams is employed acting between the inner and outer wing sections. For describing the application of hydraulic power for this purpose attention is directed to the hinged joint 28 between the inner and outer wing sections. To form the joint, as indicated in Figure 5 and as shown in greater detail in Figures 17, 18, 19 and 20, there is provided a downwardly depending hinge plate 106 on the inner wing section 26 which slightly overlaps a similar downwardly depending hinge plate 107 on the outer wing section 27. A bolt 108 pivotally secures the hinge plates together. Preferably two such pairs of pivoted hinge plates are provided, one pair respectively on the longitudinal frame elements 33 and 38, and the other pair respectively on the longitudinal frame elements 34 and 39.

In order that the wing sections may be held rigidly in operative position there is provided a lock plate 109 on the frame element 33 and a similar lock plate 110 on the frame element 38 having aligned holes 111 into which is insertable a pin 112 operated by means of a hydraulic cylinder 113. The hydraulic cylinder is adapted to inject the pin into the holes to lock the wing sections in operative position and also to withdraw the pin from the holes when the wing sections are to be collapsed. Corresponding lock plates are also provided on the frame elements 33 and 39.

Power means for moving the wing section 27 relative to the wing section 26 is embodied in a pair of hydraulic cylinders 115 and 116, the cylinder 115 being shown in solid line position in Figure 17 wherein the frame member 33 there illustrated as a channel is shown cut away to reveal the location of the hydraulic cylinder. A bracket 116' is adapted to anchor the cylinder in the frame element. A piston 117 extending from the hydraulic cylinder is guided by a bracket 118 and at its outer end is equipped with a clevis 119 to which one end of a chain 120 is attached. The chain extends centrally with respect to the frame element 33 to a point adjacent the end where it engages a sprocket 121. The chain passes from the sprocket 121 to a similar sprocket 122 at the adjacent end of the frame element 38 and after passing the sprocket 122 is anchored by a bolt 123 to the frame element 28. This arrangement is clearly illustrated in Figures 18, 20 and 21.

In operation of this portion of the device when the air cylinder 100 is extended to elevate the wing section 26 and the pins 112 are withdrawn unlocking the wing sections one from another, without the action of the hydraulic cylinders 115 the outer wing section 27 would remain on the ground and drag laterally as the inner wing section is raised. The hydraulic cylinders 115 prevent this by permitting the pistons therein to extend slowly and gradually, thereby paying out on the chains 120. Inasmuch as some tension is maintained on the chains the outer wing section 27 is lifted with the inner wing section 26. As the chain 120 is payed out gradually the outer wing section folds down gradually until when the inner wing section is in vertical position as illustrated in Figure 12 the outer wing section lies flat against it. Prior to reaching that position the inner and outer wing sections will be held in a partially collapsed position similar to that illustrated in Figure 21.

Figure 3:
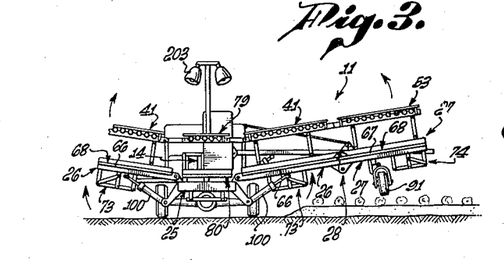
Figure 3 is a partial rear elevational view of the harvester depicted in Figure 1 showing the wings elevated slightly to permit the vehicle turning around.

On reverse operation, namely, the extending of the wing outwardly again to an operative position by the application of fluid pressure to the hydraulic cylinders 115, the piston rods 117 draw upon the chains 120 and because of the relationship of the location of the chain to the axis of the hinged joint 28, the outer wing section is lifted relative to the inner wing section and gradually extended until the wing sections have the positions illustrated in Figure 3 just prior to contact of the wing as a whole with the ground.

During these changes of adjustment from operative to collapsed position and vice versa the sections of the full crate conveyor system merely move relative to each other at their adjoining ends without it being necessary either to make or break connections between the conveyor elements mentioned. The connection between the empty crate conveyor elements has already been described in connection with Figure 22. It is, however, necessary to break the continuity of the upper or empty crate conveyor elements of the inner wing sections with the conveyor elements 79 on the platform. Located therebetween is a conveyor link 125 illustrated in Figures 5 and 6. As there shown the links, one on each side, are pivotally secured at pivot points 126 to the conveyor element 79 and removably secured at the points 127 to the conveyor elements 41. When the wing sections are to be collapsed, namely, elevating the inner wing sections to inoperative position, the points 127 are first separated permitting the conveyor links 125 to fall to the positions shown in Figure 12. The conveyor links are long enough so that there is sufficient clearance to permit the inner ends of the conveyor elements 41 when collapsed outwardly and upwardly on the inner wing sections to assume the locations illustrated in Figure 12. Tie rods 128 may be temporarily attached to hold the wings in collapsed position should it be necessary to travel any great distance down the highway.

*The full crate conveyor*

Figures 9, 10, 11:
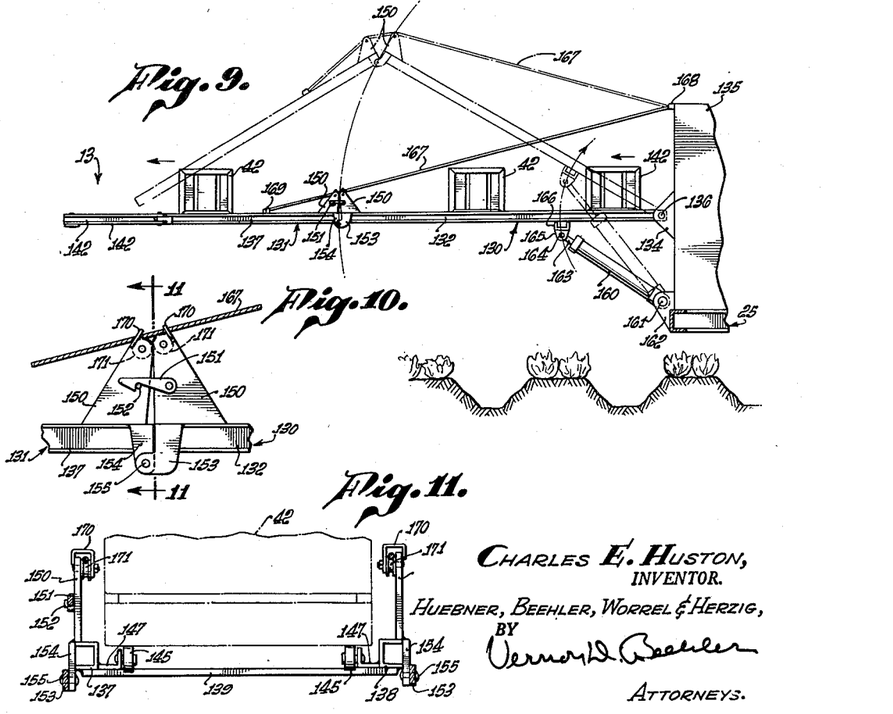
Figure 9 is a fragmentary front elevational view showing the full crate conveyor.
Figure 10 is a detailed elevational view of a joint intermediate end sections of the full crate conveyor.
Figure 11 is a cross-sectional view of the full crate conveyor taken on the line 11—11 of Figure 10.

Immediately forward of the wing on the right of the machine is the full crate conveyor 13. This conveyor is independent and entirely separately operated from the wings. The operative position of the full crate conveyor is best illustrated in Figure 9 which is an elevational view corresponding to the plan view of the same full crate conveyor as illustrated in Figures 1 and 7.

The full crate conveyor consists of an inside member 130 and an outside member 131. The inside member consists of longitudinal channels 132 and 133, both of which are attached as by means of brackets 134 to a housing 135 on the platform. Pivot pins 136 provide a pivoting joint between the inside sections and the brackets so that the full crate conveyor may be elevated to a collapsed inoperative position.

The outer section 131 is similarly constructed of longitudinal channels 137 and 138 attached together by transverse braces 139 and 140. At the outermost end of the outside member is a swinging member 141 consisting of a frame somewhat resembling the form of a parallelogram comprising longitudinal members 142 and 143 and an end member 144, each corner connection being pivotal so that the end section can assume either the full line position illustrated in Figure 7 or the dot and dash line position therein shown or other positions therebetween.

Extending along the inside member are rollers 145 for supporting the crates, the rollers being carried by suitable angle sections 146. Similar rollers are carried by angle sections 147 on the outside member and by sections 148 on the swinging member.

In extended or operative position the full crate conveyor 13 has its parts in the positions shown in Figure 9. As there illustrated plates 150 on each of the channels 132 and 137 extend upwardly to positions of abutment in which positions they are locked by application of a hook 151 over a pin 152.

For hinging the inside member 130 to the outside member 131 each of the channels on the inside member 130 are provided with hinge plates 153 overlapping hinge plates 154 on each of the channels of the outside member. A hinge pin 155 secures the hinge plates rotatably in engagement.

In extended operative position a hydraulic cylinder 160 is pivotally connected at 161 to a bracket 162 at the side of the platform 25. A piston rod 163 is pivotally secured at 164 to a bracket 165 which in turn is carried by a transverse channel 166, the channel in turn being secured to the channels at the sides of the inside member. In operative position the piston rod 163 and its piston are bottomed in the cylinder and provide a diagonal column or brace.

When the full crate conveyor is to be elevated and collapsed to inoperative position the hooks 151 are released from the pin 152. To facilitate this operation it will be noted that a cable 167 is attached at a point 168 to the housing 135 at one end and at 169 to the outside member 131 at a location removed from the hinge plate 154. Rings 170 at the tops of the plates 150 provide a sliding retention for the cable which is designed to roll over pulleys 171. As the hydraulic cylinder 160 is operated to extend the piston rod 163, thereby lifting the inside member 130, the outside member 131 is restrained from falling abruptly to a collapsed position by the restraint exercised by the cable 167 in the manner illustrated by the dot and dash lines in Figure 9. By use of the cable the outside member falls gradually into a completely collapsed position such as is illustrated in Figure 12.

*Intermediate conveyor and lidding mechanism*

For transferring full crates from the full crate conveyor to a lidding mechanism there is provided the transverse conveyor 14.

The conveyor 14 as here illustrated comprises an endless belt 170 which passes over rollers 171 and 172. These rollers are at opposite ends of an appropriate frame 173, the frame comprising outside members which are disposed obliquely upwardly from the full crate conveyor as best illustrated in Figure 4. For operating the full crate conveyor there is provided a motor 175 which rotates the roller 171 by means of a chain drive 176. To facilitate loading the conveyor belt 170, a ball roller plate 177 is provided which consists of a series of ball rollers of conventional design on a plate positioned in alignment with the full crate conveyor elements and immediately adjacent the lower end of the belt 170.

Adjacent the upper end of the belt is a short conveyor 178 which accepts full crates from the belt in a position such that they can be pushed into a conventional lidding machine 179 operated in part by an elevating screw 180 in connection with a platform 181, details of which have been omitted in the interest of brevity inasmuch as these mechanisms are widely known in the trade.

The platform 25 at this portion thereof includes wings 180 and 181 for the accommodation of lidding machine operators for the lidding machine itself and for a stack of lids 182. The level of the conveyor 178 and platform 181 of the lidding machine is made such that they are at substantially the same level as the top of the full crate conveyor. The full crate conveyor in turn accepts lidded crates in order to convey them laterally from the harvesting machine.

*Packing racks*

The packing tracks 69 and 70 heretofore referred to are adapted to slidably accommodate a series of packing racks 190, one of which is illustrated in perspective view in Figure 23. The packing racks comprise rectangular frame elements 191, 192, 193 and 194. Upon the rectangular frame are slides 195, having bent-over portions adapted to engage the tracks 169 and 170 in a rather loose fashion so that the frame may be slid freely along the track. The packing rack includes a tilted portion formed by members 196 adapted to receive the crates 42 in the tilted position illustrated in part in Figure 5 in which position they are better suited for packing. Any suitable number of packing racks can be located adjacent the packer platforms on either or both sides of each platform within easy reach of packers standing thereon. One packer may thus simultaneously fill crates with both hands and the crates may be shifted at will throughout all portions of the wing. The packing racks are designed to be removed when the wings are collapsed to inoperative position.

*Hydraulic system and power plant*

In order to assure proper performance of the harvester under all conditions the power plant 16 is installed on the vehicle. In the embodiment selected for the purpose of illustration the power plant is located at the forward end of the vehicle as illustrated in Figures 1 and 4. This power plant may be successfully operated as a gasoline driven generator, the current of which is used to drive the motor 175. This motor, as has been previously indicated, is adapted to operate the transverse conveyor 14. The motor is also shown as connected by means of a belt or chain drive 200 to a pump 201. Lights 202 and 203 to facilitate operation at night may be operated from the generator.

Figure 13:
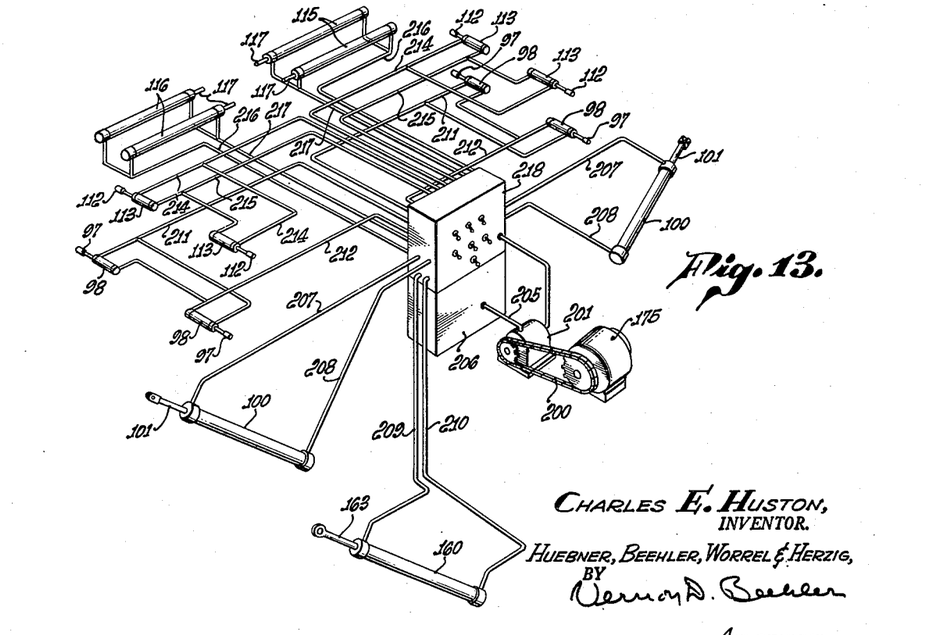
Figure 13 is a schematic view of the hydraulic system for positioning the movable parts of the harvester.

The connection between the pump 201 and the hydraulic system is illustrated schematically in Figure 13. As there shown the pump 201 is connected by a hydraulic or fluid pressure line 205 to a fluid pressure reservoir 206. From this pressure reservoir hydraulic lines 207 and 208 lead to the cylinders 100, one on each side of the machine, these cylinders being to operate the main wings. Hydraulic lines 209 and 210 lead to the cylinder 160 which operates the full crate conveyor.

Two other hydraulic lines 211 and 212 feed the cylinders 98 which operate the pins for locking and unlocking the ports for the wheels 90 and 91 which in turn support the wing in operative position. Hydraulic lines 214 and 215, interconnected as shown, supply cylinders 113 which manipulate the pins for locking and unlocking the hinge plates 109 and 110 of the inner and outer wing sections.

Hydraulic lines 216 and 217 feed hydraulic cylinders 115 on each of the inner wing sections which cylinders operate to move the outer wing section in each case with respect to the inner wing section. A hydraulic valve unit 218 of conventional design including appropriate valves and valve handles connects with each of the hydraulic lines so that the different sets of cylinders may be operated at will, that is to say, the locking and unlocking cylinders may be manipulated at pleasure, and the hydraulic cylinders for each of the wings may be operated separately or together and also independently of the cylinders 115 which in turn move one wing section with relation to the other. By operation of the power plant described there may be maintained sufficient power to operate the entire hydraulic system independent of the motor which drives the truck.

*Operation*

When the harvester is to be operated the vehicle which carries the harvester is moved into the field so that the wheels of the vehicle travel between the rows of the crops to be harvested. Once in position the wings are lowered by manipulation of the hydraulic cylinders 100 and 115 in the manner heretofore described. As the wings are lowered wheels 90 and 91 move by gravity to ground-engaging position, while both of the wing sections are gradually lowered to operative position.

Once the wing section and wheels assume their proper position, the hydraulic cylinders 98 are placed in operation to lock the wheels in place and the cylinders 113 are placed in operation to lock the hinges in extended position.

Thereafter, or simultaneously as the case may be, the full crate conveyor is also lowered to extended operative position by manipulation of the hydraulic cylinder 160. Once in extended position the hook 151 is placed over the pin 152 in order to lock the members of the full crate conveyor in operative position.

When the wing has been lowered the empty crate conveyor elements 41 and 53 are lifted from the collapsed position to the elevated position illustrated in Figures 4 and 5, for example, where the elements 41 and 53 are positioned end to end and joined at their adjacent ends. The spring 58 is useful in drawing these parts to their proper position. Once in position, the conveyor links 125 are hooked in place and the conveyors are ready to operate.

The platforms suspended below the wing sections also extend by gravity and can likewise be locked in their extended position in the manner illustrated and already described.

The service truck 17 can then be driven into position adjacent the end of the left-hand wing as suggested in Figure 1. In this position empty crates can be loaded upon the empty crate conveyor at the left end and advanced clear across the entire machine to the right-hand wing. Packers working on the packing platforms can then lift the empty crates from the conveyor and place them upon the packing racks, where they are filled with vegetables placed upon the loading platform 68 by workers on the ground. After the crates are properly filled the packers then lift the full crates from the packing racks and place them on the full crate conveyor. There they are pushed endwise along the full crate conveyor inwardly toward the platform 25. As each crate in turn advances to the roller plate 177 they may be pushed upon the conveyor belt 170 which lifts the full crates and carries them to the conveyor 178.

At this point in the operation a workman standing on the wing 180 places a lid from the stack 182 upon the packed crate, pushes the packed crate to the conventional lidding machine and after the lidding operation the crate may be pushed from the lidding machine by the next crate to be lidded. The lidded crate advances to the inside end of the full crate conveyor where by pushing one crate against another the full lidded crates are gradually advanced to the outside end of the full crate conveyor. There they may be loaded upon the service truck 18 which may be positioned adjacent the end of the full crate conveyor. As the harvester advances down the rows the service trucks likewise can be driven at a corresponding pace so that the loading and unloading operations may be carried on continuously. The swinging end 141 of the full crate conveyor may be utilized to facilitate loading without it being necessary to continually drive the truck 18 forward as each row of crates is piled up on it. If need be the service truck 18 may be utilized both for loading empty crates upon the harvester and unloading full crates from the harvester. Moreover, if need be, full crates can be loaded from the full crate conveyor at either outside end to a service truck, thereby speeding up the operation if that might be necessary and under circumstances where the lidding operation can be curtailed.

By operation of the parts of the machine herein described low-growing crops may be cut from the ground, loaded upon hte harvester and there completely packed in crates which when they leave the harvester are ready for stacking in freight cars for shipment to distant points.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A harvesting machine comprising a self-propelled vehicle having a rearwardly extending platform, wings extending laterally outwardly from the sides of the platform and hinged thereto, each said wing comprising an inner section adjacent the platform and an outer section positioned when extended endwise relative to the inner section and hinged thereto, a horizontally pivoting hinge connection between said sections movable in a direction enabling closing of the outer and inner sections when the hinge is elevated, crate conveyor elements on the wing sections, a hydraulic elevating ram angularly disposed between the truck and each wing, said ram being located beneath the wing and having one end secured to the truck and the other end secured to the inner section of each respective wing and adapted upon movement in one direction to lift the inner wing section and the outer section at the inner end thereof whereby to close said outer and inner sections one upon the other, and wheels beneath each of said outer wing sections having a collapsible hinged connection to one of said wing sections of the respective wing.

2. A harvesting machine comprising a self-propelled vehicle having a rearwardly extending platform, wings extending laterally outwardly from the sides of the platform and hinged thereto, each said wing comprising an inner section adjacent the platform having a pivot connection to the truck and an outer section positioned endwise to the inner section, said outer section having a hinged connection to the inner section at a pivot point removed laterally from a common longitudinal axis of said sections when in open position, crate conveyor elements on the wing sections, a hydraulic elevating ram angularly disposed between the truck and each wing having one end pivotally secured to the truck at a point vertically removed from the pivot connection of the inner section thereto and the other end pivotally secured to said respective inner wing section and adapted upon movement in one direction to lift said respective wing section, a second hydraulic ram on one of the sections of each wing having a connection therefrom to a pivot connection on the other wing section at a point vertically removed from the connection between said sections, said second hydraulic ram being adapted when operated in one direction to enable the wing sections to fold together and when operated in an opposite direction to straighten the wing sections one relative to the other.

3. A harvesting machine comprising a self-propelled vehicle having a rearwardly extending platform, wings extending laterally outwardly from the sides of the platform and hinged thereto, each said wing comprising an inner section adjacent the platform and an outer section positioned endwise to the inner section and hinged thereto, crate conveyor elements on the wing sections, said conveyor elements having collapsible vertical supports, a hydraulic elevating ram for each wing having one end secured to the truck and the other end secured to the inner section of said respective wing and adapted upon movement in one direction to lift said respective wing, a second hydraulic ram on one of the sections of each wing having a connection therefrom to the other wing section, said second hydraulic ram being adapted when operated in one direction to enable the wing sections to fold together and when operated in an opposite direction to straighten the wing sections one relative to the other, individual hydraulic controls for said rams, and wheels beneath and secured to said wings having a collapsible hinged connection to one of said wing sections.

4. A harvesting machine comprising a self-propelled vehicle having a rearwardly extending platform, wings extending laterally outwardly from the sides of the platform and hinged thereto, each said wing comprising an inner section adjacent the platform and an outer section positioned endwise to the inner section and hinged thereto at a hinge joint below the plane of said sections, upper and lower crate conveyor elements on each wing section and on the platform, said upper crate conveyor elements having collapsible vertical supports and adapted for endwise abutment one with another in operative position, removable connection elements between the upper crate conveyor elements on respectively the platform and inner wing sections, a hydraulic elevating ram for each wing having one end secured to the truck below the junction of the respective inner wing section with the platform and the other end secured to said respective inner wing section and adapted upon extension to lift said respective wing section angularly upward, a second hydraulic ram on one of the sections of each wing attached to the other wing section through the connection therebetween, said second hydraulic ram being adapted when hydraulic pressure is released to permit folding of the wing sections together and when hydraulic pressure is applied to straighten the wing sections one relative to the other, hydraulic control means individually operable with each said ram, and wheels beneath said wing sections having a collapsible hinged connection to one of said wing sections adjacent the joint therebetween.

5. A harvester machine comprising a self-propelled vehicle having a rearwardly extending platform, conveyor and packing stance wings extending laterally from said platform, a horizontal hinge joint between each wing and the platform, a bracket extending below said platform, a hydraulic ram for each wing attached at one end to the lower end of the bracket and at the other end to the respective wing, each said wing having outer and inner sections and a hinge joint therebetween, said inner section being movable upward to inoperative position and said outer section being foldable against the bottom of said inner section, and a hydraulic wing-extending ram in one of the sections of each wing connected to the other section and operable independently of the first hydraulic ram, said wing-extending ram being adapted when operated to unfold said sections one with respect to the other.

6. A harvester machine comprising a self-propelled vehicle having a rearwardly extending platform, conveyor and packing stance wings extending laterally from said platform, a horizontal hinge joint between each wing and the platform, a bracket extending below said platform, a hydraulic ram for each wing attached at one end to the lower end of the bracket and at the other end to the respective wing, each said wing having outer and inner sections and a hinge therebetween having the joint thereof located below the sections, said inner section being movable upward to inoperative position and said outer section being foldable against the bottom of said inner section, and a hydraulic ram in one of the sections of each wing and connected thereto, said last identified ram having a movable connection to the other section and being located below the axis of the hinge between said wing sections, said last identified ram being adapted when operated to unfold said sections one with respect to the other.

7. A harvester machine comprising a self-propelled vehicle having a rearwardly extending platform, conveyor and packing stance wings extending laterally from said platform, a hinge joint extending lengthwise of the truck between each wing and the platform, a bracket extending below said platform, a hydraulic ram for each wing attached at one end to the lower end of the bracket and at the other end to the respective wing, each said wing having outer and inner sections and a hinge therebetween having the joint thereof located below the sections, a wheel and a wheel support therefor on the outer section of each wing, said support having a hinge joint connecting the support to said section at substantially the same level as said hinge joint between said sections, said inner sections being movable upward to inoperative position and said outer section being foldable against the bottom of said inner section and providing a space therebetween for said wheels in folded position, and a hydraulic ram in one of the sections of each wing connected to the other section and located below the upper surface of the wing adapted when operated to unfold said sections one with respect to the other.

8. In a harvester machine comprising a vehicle, a laterally extending collapsible wing therefor comprising outer and inner wing sections, said inner wing section having a hinge joint to said vehicle enabling said inner wing section to move upwardly and a hydraulic ram between the vehicle and the inner section adapted to move said inner section upwardly, said outer wing section having a hinge joint below the level thereof to the inner wing section enabling said outer wing section to move downwardly, a hydraulic ram lying longitudinally disposed in one of said wing sections having an extension running to the other section at a location above the hinge joint therebetween, locking means at adjoining ends of said sections, and a wheel and a collapsible mounting for said wheel hinged to one of said sections including locking means between said mounting and the respective wing section.

9. In a harvester machine comprising a vehicle, a laterally extending collapsible wing therefor comprising outer and inner wing sections, said inner wing section having a hinge joint to said vehicle enabling said inner wing section to move upwardly and a hydraulic ram between the vehicle and the inner section adapted to move said inner section upwardly, said outer wing section having a hinge joint below the level thereof to the inner wing section enabling said outer wing section to move downwardly, a hydraulic ram lying longitudinally disposed in each inner wing section having a flexible extension running to the respective outer section at a location above the hinge joint therebetween, locking brackets at adjoining ends of said sections adapted to overlap and having holes therein in alignment in operative position and a hydraulic ram on one of the sections and a pin actuated thereby adapted to be inserted into and removed from said holes, a wheel and a collapsible mounting for said wheel hinged to one of said sections of each wing, the mounting and respective wheel having holes therein aligned when in operative position and a hydraulic ram and a pin actuated thereby adapted to be inserted into and removed from said holes, a common source of hydraulic energy on said vehicle, pressure lines from said source to the hydraulic rams and individual controls adapted to control each said ram separately in a selected sequence.

10. A harvesting machine comprising a vehicle having a platform thereon, a conveyor wing adapted to extend laterally outwardly from the side of the platform to operative position and hinged to the vehicle with hinges providing upward movement for the wing to folded position, said wing comprising inner and outer sections in endwise relation when extended and having a horizontal hinged connection therebetween enabling said sections to fold bottom to bottom, and rigid linearly extensible power means located below the wing and secured to the vehicle and the wing adapted to move said wing between folded and extended positions.

11. A harvesting machine comprising a self-propelled vehicle having a rearwardly extending platform, wings extending laterally outwardly from the sides of the platform, each said wing comprising an inner section having a hinged joint at the inner end thereof to the platform for movement upwardly and an outer section having a hinged connection at the inner end thereof to the outer end of the inner section for retracting movement of the outer section downwardly when the inner section is elevated, and means limiting extension of the outer section relative to the inner section to positions of horizontal alignment with each other, power means mounted in an angular direction along a line removed from the hinged joint and connected respectively to the inner section and the platform and adapted to elevate and to control lowering of said inner section, and independent power means connected respectively to the inner and outer sections along a line spaced upwardly of the axis of the hinged connection therebetween and adapted to extend the outer section relative to the inner section and to control retraction of said outer section relative to said inner section.

References Cited in the file of this patent

UNITED STATES PATENTS

| Number | Name | Date |
|---|---|---|
| 2,219,926 | Jensen | Oct. 29, 1940 |
| 2,293,486 | Barrett | Aug. 18, 1942 |
| 2,321,387 | Jackson | June 8, 1943 |
| 2,426,980 | Ball | Sept. 9, 1947 |
| 2,473,587 | Huston | June 21, 1949 |
| 2,522,588 | Sutherland | Sept. 19, 1950 |
| 2,536,259 | Brewer | Jan. 2, 1951 |
| 2,570,530 | Domitrovic | Oct. 9, 1951 |
| 2,590,965 | Huston | Apr. 1, 1952 |